(12) United States Patent
Autry

(10) Patent No.: US 9,408,400 B2
(45) Date of Patent: Aug. 9, 2016

(54) HIDE GRIPPING DEVICE

(71) Applicant: Billy Arthur Autry, Guy, AR (US)

(72) Inventor: Billy Arthur Autry, Guy, AR (US)

( * ) Notice: Subject to any disclaimer, the term of this patent is extended or adjusted under 35 U.S.C. 154(b) by 0 days.

(21) Appl. No.: 14/668,743

(22) Filed: Mar. 25, 2015

(65) Prior Publication Data
US 2015/0272138 A1 Oct. 1, 2015

Related U.S. Application Data

(60) Provisional application No. 61/971,448, filed on Mar. 27, 2014.

(51) Int. Cl.
*A22B 5/00* (2006.01)
*A22B 5/16* (2006.01)

(52) U.S. Cl.
CPC ..................................... *A22B 5/168* (2013.01)

(58) Field of Classification Search
CPC ...... A22C 25/00; A22C 25/02; A22C 25/025; A22C 17/12; A22C 25/17; A22C 25/185; A22B 5/161; A22B 5/00; A22B 5/168
USPC .................................. 452/128, 102–105, 132
See application file for complete search history.

(56) References Cited

U.S. PATENT DOCUMENTS

| | | | |
|---|---|---|---|
| 476,189 A * | 5/1892 | Decker | B26B 19/24 119/617 |
| 716,082 A | 12/1902 | McKinly | |
| 1,949,452 A | 3/1934 | Chadwick | |
| 2,179,758 A * | 11/1939 | Schlueter | A22C 25/025 15/236.08 |
| 2,757,951 A | 8/1956 | Benton | |
| 2,946,084 A * | 7/1960 | Boutillette | A22C 25/006 452/128 |
| 3,163,885 A | 7/1962 | Dumas et al. | |
| 3,169,034 A | 2/1965 | Epstein | |
| 4,198,751 A * | 4/1980 | Egbert | A22C 25/006 30/286 |
| 4,635,319 A | 1/1987 | Gast | |
| 6,213,055 B1 * | 4/2001 | Willinger | A01K 13/002 119/633 |
| 7,159,274 B2 * | 1/2007 | Freidell | A01K 13/002 119/628 |
| 7,225,845 B2 * | 6/2007 | Ellmann | B60C 23/12 152/419 |
| 7,748,350 B2 * | 7/2010 | Vandervoet | A01K 13/002 119/618 |
| 8,082,887 B2 * | 12/2011 | Fernandez | A01K 13/002 119/612 |
| 8,359,755 B1 * | 1/2013 | Laube | A01K 13/002 119/611 |
| 8,881,684 B1 * | 11/2014 | Yazdanpanah | A46B 7/04 119/600 |

\* cited by examiner

*Primary Examiner* — Richard Price, Jr.
(74) *Attorney, Agent, or Firm* — Henry C. Query, Jr.

(57) ABSTRACT

A hide gripping device has an elongated head, a plurality of teeth which are connected to the head in a row that extends generally parallel to a longitudinal axis of the head, and a handle which is connected to the head and is oriented in a vertical plane that extends generally perpendicularly to the longitudinal axis. The handle includes an elongated hand grip which extends in a first horizontal plane that is vertically spaced apart from a second horizontal plane in which the longitudinal axis lies, and the teeth extend from the head in a direction opposite the hand grip.

20 Claims, 3 Drawing Sheets

HIDE GRIPPING DEVICE

This application is based on and claims the benefit of U.S. Provisional Patent Application No. 61/971,448 filed on Mar. 27, 2014.

BACKGROUND OF THE INVENTION

The present invention is directed to a device for aiding a person in skinning an animal, such as a deer. More particularly, the invention is directed to a device for aiding a person in gripping the hide of the animal while the he trims the hide away from the meat of the animal.

There are several ways to skin a deer. In one method, an incision is made around the neck, a portion of the hide is sliced away from the meat of the neck, and the hide is then pulled from the carcass, either by hand or with the use of a hide pulling apparatus, such as that disclosed in the inventor's co-pending U.S. patent application Ser. No. 13/815,999. The hide is normally separated from the meat of the neck by gripping and pilling the hide with one hand while the hide is sliced away from the meat with the other hand. However, this technique requires that the hide-gripping hand be positioned close to the knife. Consequently, a risk exists that the knife will cut the hide-gripping hand.

Several tools exist to aid a person in gripping the hide while it is being sliced away from the meat. For example, U.S. Pat. No. 4,635,319 to Gast discloses a pliers-like device which comprises opposing sets of hide gripping teeth mounted to the distal ends of two pivotally-connected handles. In use, the proximal ends of the handles must be manipulated to separate the two sets of teeth, position the teeth around the hide and then firmly engage the teeth with the hide. This process requires a certain degree of manual dexterity. In addition, since the teeth are engaged with the hide by pressing the proximal ends of the handles together, a reasonable likelihood exists that the teeth will puncture the hide, which is undesirable.

SUMMARY OF THE INVENTION

In accordance with the present invention, these and other limitations in the prior art are overcome by providing a hide gripping device comprising a plurality of teeth which are mounted to an elongated head that in turn is connected to a transverse handle. The handle is configured to position the user's hand away from the teeth. Thus, no risk exists that the user's hand will be injured during the skinning process. Also, both the teeth and the handle are configured to enable the user to grip the hide with a slight downward twist of the wrist and to release the hide with a slight upward twist of the wrist. Thus, the hide may be repeatedly gripped and released quickly and easily, which greatly simplifies the skinning process.

These and other objects and advantages of the present invention will be made apparent from the following detailed description, with reference to the accompanying drawings.

DETAILED DESCRIPTION OF THE INVENTION

The gripping device of the present invention will now be described with reference to FIGS. 1-4. In its basic form, the gripping device, which is indicated generally by reference number 10, comprises a plurality of teeth 12 which are mounted on a head 14 that in turn is connected to a handle 16. The head 14 is an elongated member which extends transverse to the handle 16, and the teeth 12 are arranged in a row which extends parallel to the longitudinal axis of the head. Although the head 14 is shown as being generally rectangular, it could have any configuration which provides a sufficient mounting surface for the teeth 12 and an adequate connection point for the handle 16, such as that of a cylinder or a strip.

Figure 1:
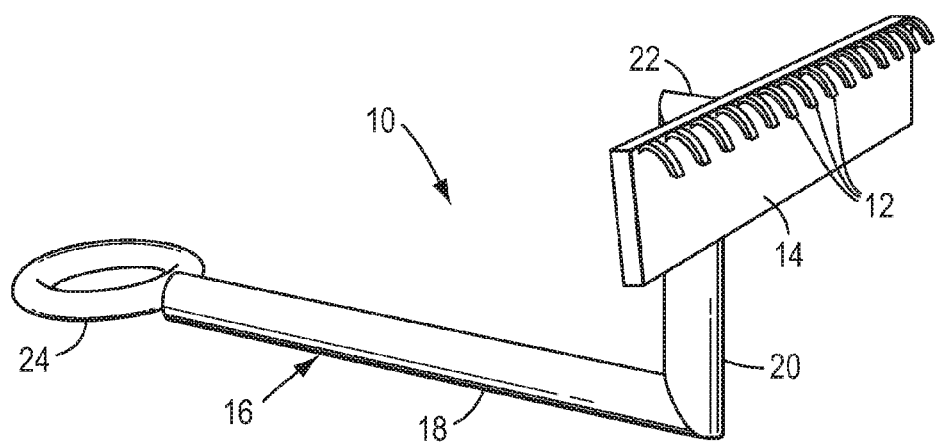
FIG. 1 is a front perspective view of an exemplary embodiment of the hide gripping device of the present invention.
Figure 2:
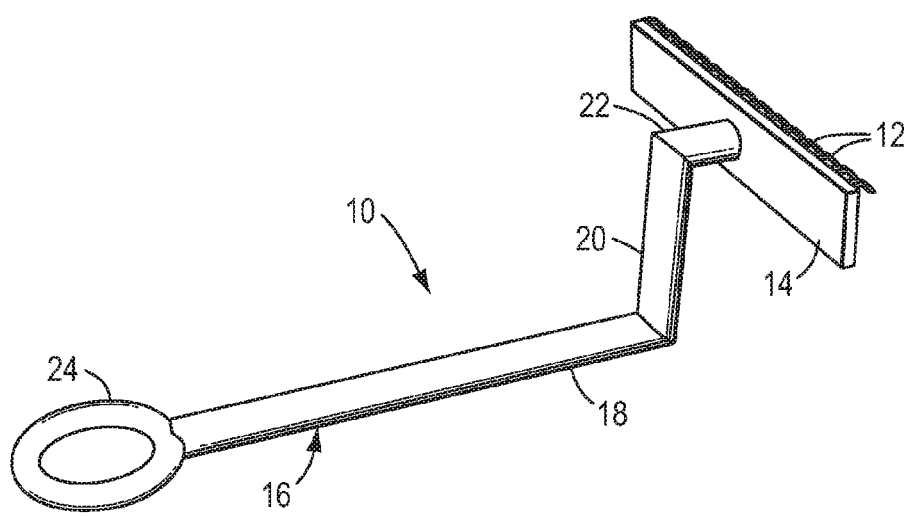
FIG. 2 is a rear perspective view of the hide gripping device shown in FIG. 1.
Figure 3:
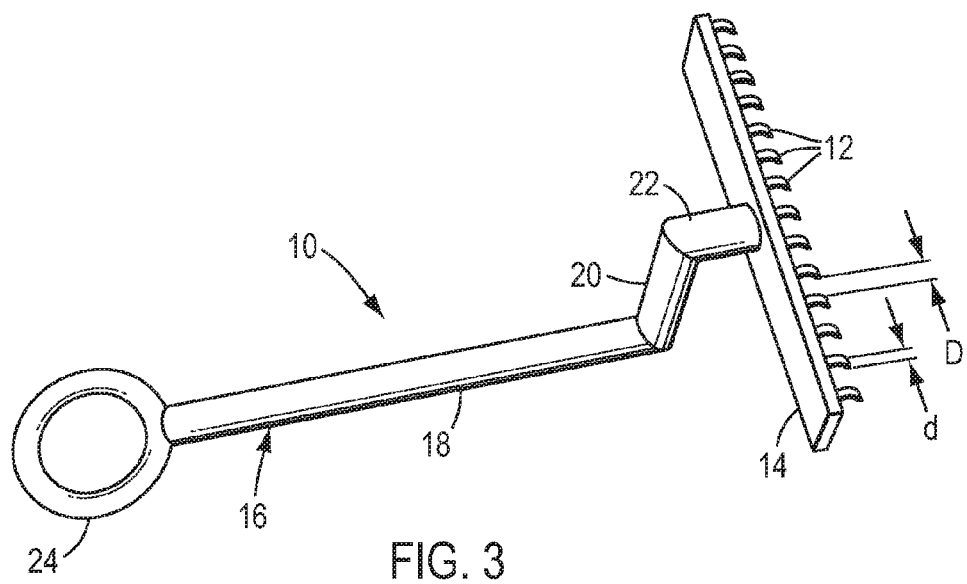
FIG. 3 is a top perspective view of the hide gripping device shown in FIG. 1.
Figure 4:
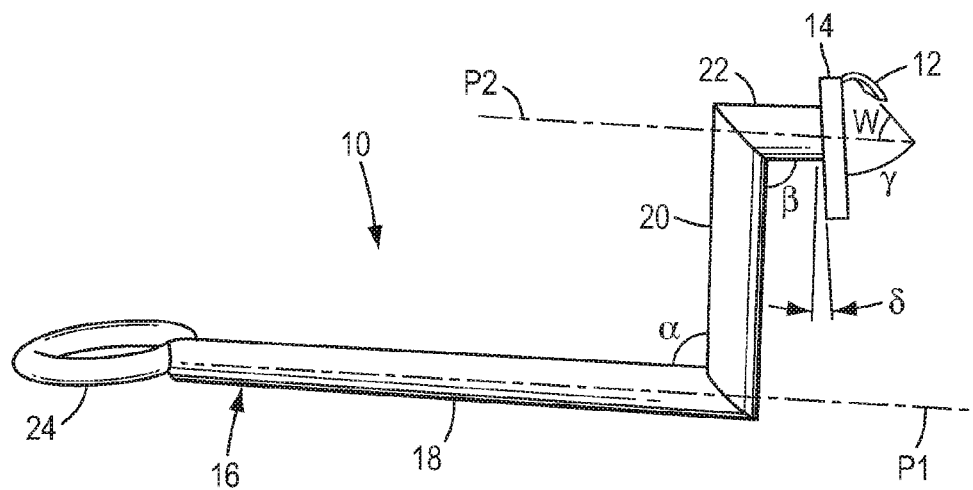
FIG. 4 is a side elevation view of the hide gripping device shown in FIG. 1.

An important function of the handle 16 is to space the user's hand away from the knife during the initial hide trimming operation. Accordingly, the handle 16 may comprise any practical configuration which accomplishes this goal, such as a straight or even a curved elongated member. However, in a more preferred embodiment of the invention, the handle comprises a hand grip 18 which is spaced apart from the head 14 by a transverse shaft 20, As illustrated in FIG. 4, the hand grip extends in a first horizontal plane P1 which is vertically spaced apart from a second horizontal plane P2 that extends through the longitudinal axis of the head 14. In the exemplary embodiment of the invention shown in the drawings, the handle also includes a neck 22 which is connected between the head 14 and the distal end of the shaft 20. As shown best in FIG. 4, the shaft 20 is oriented at an angle $\alpha$ relative to the grip 18 and the neck 22 is oriented at an angle $\beta$ relative to the shaft. The angles $\alpha$ and $\beta$ are designed to situate the user's hand, which in use of the hide gripping device 10 is positioned around the hand grip 18, at a comfortable and efficient operating position relative to the head 14, and specifically the teeth 12. In the exemplary embodiment of the invention shown in the drawings, for example, the angles $\alpha$ and $\beta$ are each approximately 90°.

The teeth 12 are designed to securely hold but preferably not puncture the hide during use of the gripping device 10. In addition, the teeth 12 are ideally configured so that that they will engage the hide with a slight downward rotation of the head 14 but will quickly and easily release the hide with a slight upward rotation of the head. In this manner, the hide may be gripped, trimmed from the meat and then released to be moved to a new position with two simple turns of the wrist.

In an exemplary, non-limiting embodiment of the invention, the teeth 12 may be generally quarter-circular or quarter-ovular in shape and form an angle $\gamma$ with the head of between about 30° and 60°, such as about 45°. Also, the teeth 12 may have a width d of about one-eighth inch and be spaced apart a distance D of between about 2d and 5d. In addition, the head 14 may be connected at an angle $\delta$ relative to the neck 22 in order to ensure that the teeth 12 are oriented at a suitable angle relative to the hand grip 18 so as facilitate the effective gripping of the hide with a simple downward turn of the wrist. The value for the angle $\delta$, if employed, will depend on the particular configuration of the handle 16, the head 14 and the teeth 12. In the illustrative, non-limiting embodiment of the invention shown in the drawings, for example, $\delta$ is between approximately 15° and 20°.

Thus it may be seen that the teeth 12 extend from the head 14 in a direction opposite the hand grip 18. In the exemplary embodiment of the invention depicted in FIG. 4, the teeth 12 extend from the head 14 toward the first horizontal plane P1 at an acute angle W relative to the second horizontal plane P2 (and thus the hand grip 18). When as shown in FIG. 4 the hand grip 18 and the neck 22 are generally parallel, the value of W will be approximately equal to 90° minus the sum of the angles γ and δ. For example, when γ is 15° and δ is 45°, W is 30°. Likewise when γ is 15° and δ is 15°, W is 60°.

Figure 5:
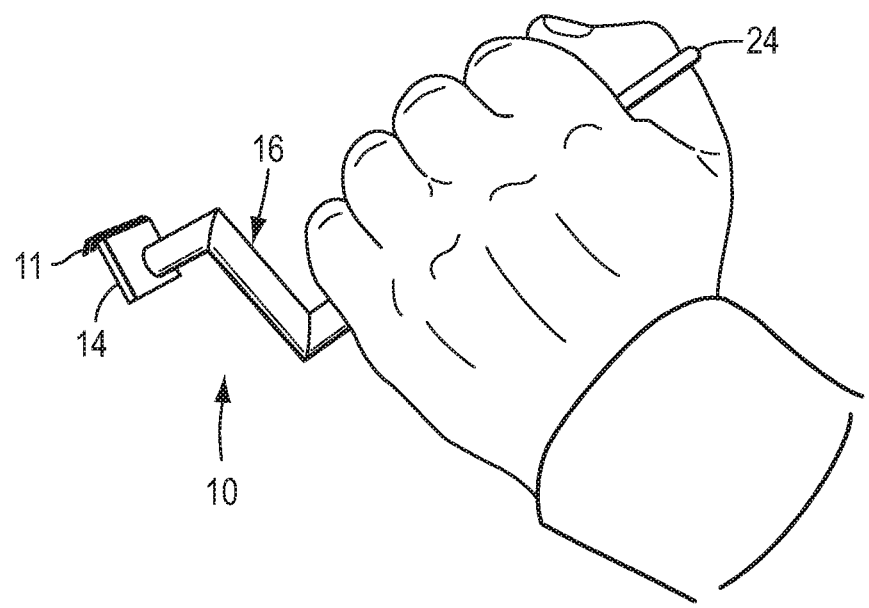
FIG. 5 is a representation of the hide gripping device of FIG. 1 shown being gripped by a person's hand.

The hide gripping device 10 may also comprise means for stabilizing the head 14 during the trimming operation. In one embodiment of the invention, for example, such means includes a ring member 24 which is connected to the proximal end of the hand grip 18. As shown in FIG. 5, when the user grips the handle 16, his thumb is inserted through the ring member. Thus, during the trimming operation, any uneven forces acting on the head 14 which would otherwise cause the handle 16 to twist will be resisted by the user's thumb. In an exemplary embodiment of the invention, the ring member lies in a plane which is parallel to the longitudinal axis of the head 14.

Figure 6:
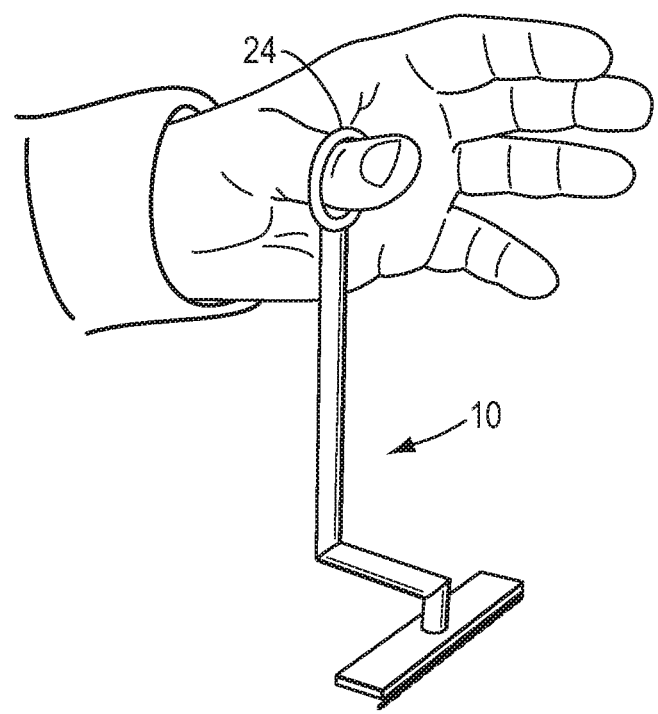
FIG. 6 is a representation of the hide gripping device of FIG. 1 shown suspended from a user's thumb.

The ring member 24 also provides a means to enable the user to hold onto the gripping device 10 while freeing up his hand for other uses. As shown in FIG. 6, if during the trimming operation the user temporally needs to use his hand for a different task, the gripping device 10 may be suspended from his thumb by the ring member 24. In this position, the hand may be used with little or no interference from the gripping device 10.

In use of the gripping device 10, the handle 16 is gripped as shown in FIG. 5, with the fingers of the user's hand wrapped around the hand grip 18 and his thumb inserted through the ring member 24. The user then positions the head 14 next to the hide and moves or pivots his wrist slightly downward to engage the teeth 12 with the hide. The user then pulls on the handle 16 to grip the hide while he uses his other hand to slice the hide away from the meat. After that portion of the hide is sliced away from the meat, the user moves or pivots his wrist slightly upwardly to disengage the teeth 12 from the hide and then moves the head 14 to an adjacent portion of the hide. This process is then repeated until the desired amount of hide is separated from the carcass of the animal.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

I claim:

1. A hide gripping device which comprises:
an elongated head;
a plurality of teeth which are connected to the head in a row that extends generally parallel to a longitudinal axis of the head; and
a handle which is connected to the head and is oriented in a vertical plane that extends generally perpendicularly to the longitudinal axis, the handle comprising an elongated hand grip which extends in a first horizontal plane that is spaced vertically below a second horizontal plane in which the longitudinal axis lies;
wherein the teeth extend from the head in a direction opposite the hand grip.

2. The hide gripping device of claim 1, wherein the teeth extend toward the first horizontal plane at an acute angle relative to the second horizontal plane.

3. The hide gripping device of claim 2, wherein the teeth extend toward the first horizontal plane at an angle of between about 30° and 60° relative to the second horizontal plane.

4. The hide gripping device of claim 3, wherein the handle further comprises a shaft which extends vertically between a first end of the hand grip and the head.

5. The hide gripping device of claim 4, wherein the shaft extends generally perpendicularly to the hand grip.

6. The hide gripping device of claim 5, wherein the handle further comprises a neck which is connected between the shaft and the head.

7. The hide gripping device of claim 6, wherein the neck extends generally perpendicularly to the shaft.

8. The hide gripping device of claim 7, further comprising means for stabilizing the head during use of the hide gripping device.

9. The hide gripping device of claim 8, wherein the stabilizing means comprises a ring member which is connected to a second end of the hand grip and is configured to receive a user's thumb when the user's hand is positioned around the hand grip.

10. The hide gripping device of claim 9, wherein the ring member is oriented generally parallel to the first horizontal plane.

11. The hide gripping device of claim 1, wherein the head comprises a generally rectangular configuration.

12. The hide gripping device of claim 11, wherein the handle is connected to the head such that the hand grip is located on a first side of the head and the teeth are located on a second side of the head opposite the first side.

13. The hide gripping device of claim 12, wherein the plurality of teeth consists of a single row of teeth.

14. The hide gripping device of claim 13, wherein the teeth are positioned adjacent an upper edge of the head.

15. The hide gripping device of claim 13, wherein the teeth extend toward the first horizontal plane at an acute angle relative to the second horizontal plane.

16. The hide gripping device of claim 13, wherein the handle further comprises a shaft which extends vertically between a first end of the hand grip and the head.

17. The hide gripping device of claim 16, wherein the shaft extends generally perpendicularly to the hand grip.

18. The hide gripping device of claim 16, wherein the handle further comprises a neck which is connected between the shaft and the head.

19. The hide gripping device of claim 18, wherein the neck extends generally parallel to the hand grip.

20. The hide gripping device of claim 13, further comprising means for stabilizing the head during use of the hide gripping device.

* * * * *